United States Patent [19]

Crawford

[11] Patent Number: 5,166,791
[45] Date of Patent: Nov. 24, 1992

[54] VIDEO PICTURE AND WAVEFORM DISPLAY WITH LINE SELECTION

[75] Inventor: Douglas C. Crawford, Pottstown, Pa.

[73] Assignee: Videotek, Inc., Pottstown, Pa.

[21] Appl. No.: 761,674

[22] Filed: Sep. 18, 1991

[51] Int. Cl.$^5$ .................................. H04N 17/02
[52] U.S. Cl. .................................. 358/139; 358/10
[58] Field of Search ............... 358/139, 10; 324/77 A, 324/77 B

[56] References Cited

U.S. PATENT DOCUMENTS

| | | | |
|---|---|---|---|
| 4,740,841 | 4/1988 | Slavin | 358/139 |
| 4,768,091 | 4/1988 | Pooler et al. | 358/139 |
| 4,953,017 | 8/1990 | Ivey et al. | 358/139 |

Primary Examiner—James J. Groody
Assistant Examiner—Mark R. Powell
Attorney, Agent, or Firm—Eckert Seamans Cherin & Mellott

[57] ABSTRACT

A video monitoring device displays on the same CRT screen a picture format video signal and a graphic format of one or more selected horizontal lines in the video signal, the selected line being highlighted in the picture format. An intensity modulator, and vertical and horizontal deflection modulators are coupled to the beam generator and to the deflection circuits, the modulators also being coupled to a control device for changing functions from picture format display to graphic format display as the beam is deflected in a raster pattern. A video memory stores at least the video information of the line to be displayed, for reading out the information in the graphic format. The control device outputs at least one control word for each horizontal line, to switch between the picture format, wherein luminance, saturation and hue are controlled by the amplitude, DC offset and frequency of the video signal, and the graphic format, wherein luminance is held constant and vertical deflection is modulated by the amplitude of the video signal during horizontal scanning, for producing the graphic display.

20 Claims, 2 Drawing Sheets

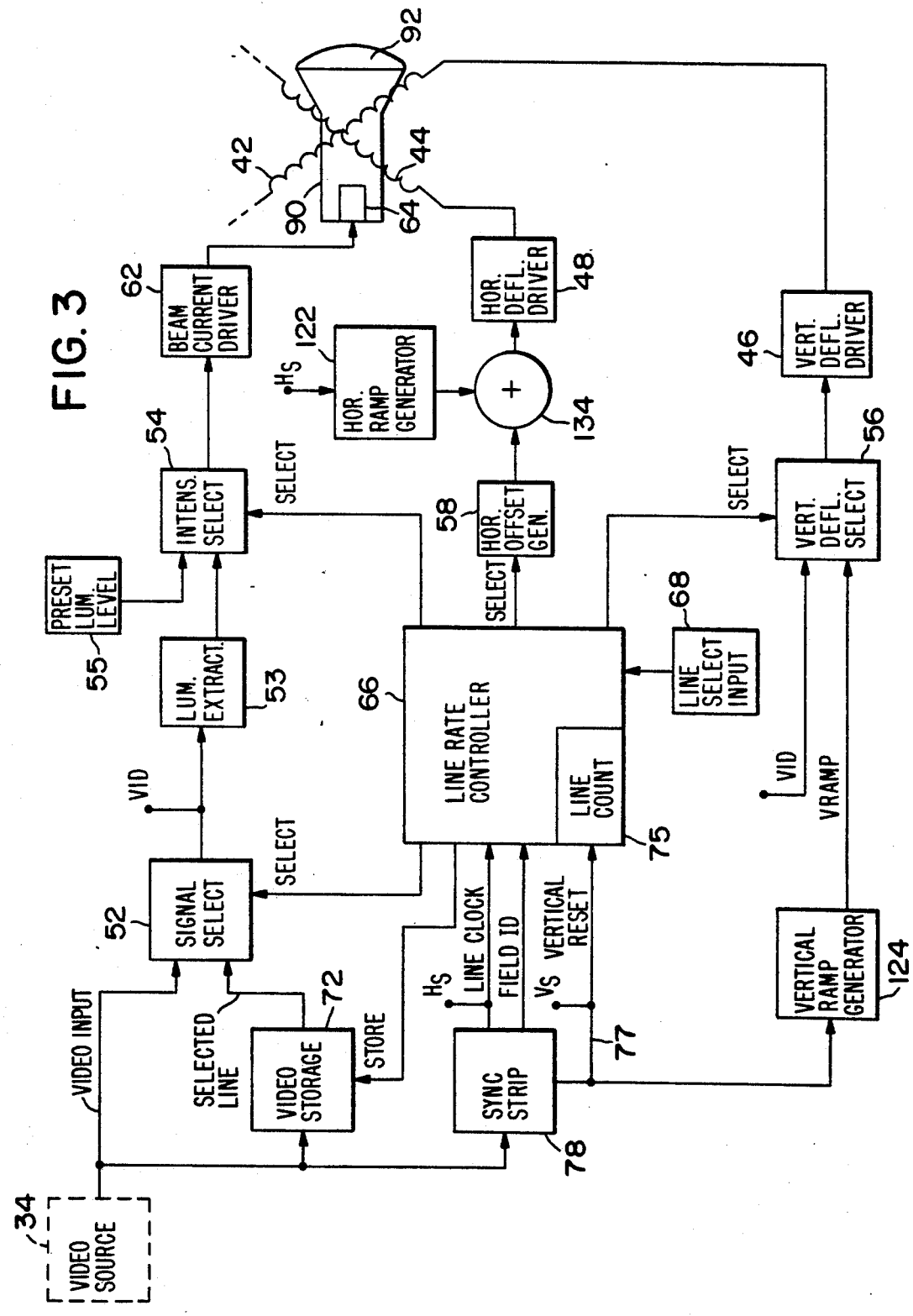

VIDEO PICTURE AND WAVEFORM DISPLAY WITH LINE SELECTION

BACKGROUND OF THE INVENTION

1. Field of the Invention

This invention relates to methods and apparatus for displaying video pictures and video waveforms such as those of commercial television signals, for use by production or broadcasting personnel. The invention provides simultaneous display on one CRT of a television picture and the video waveform signal at one or more selected horizontal lines of the television picture, by modulation of the electron beam intensity and deflection signals. A line whose waveform is displayed graphically is highlighted in the picture, which appears on the screen adjacent the waveform.

2. Prior Art

Video signals are composed of lines and fields, a video line being one horizontal trace of the electron beam across the television screen. Electromagnetic deflection coils driven by ramp current signals from the deflection drive circuits drive the beam horizontally and vertically to define a raster, with a plurality of horizontal lines occurring during each vertical deflection ramp. A field is the required number of successive horizontal lines which fill the screen from top to bottom as the electron beam is deflected vertically, being deflected horizontally at each line between retraces. The field can be defined by two frames of interlaced horizontal lines.

In a moving picture arrangement the video information in successive video fields changes. The changes often are relatively small, but important to the video program, the changes providing the moving picture aspects of the program. It is desirable for production personnel to monitor the aspects of the video signal at selected portions of the video signal which correspond to selected areas on the screen. It may be desirable, for example, to study individual horizontal lines from one field in the video signal or from a set of fields.

Test equipment which displays a horizontal line of video waveform in a graphic format is known. An oscilloscope operable to scan at a time base corresponding to a horizontal scan line will display graphically the amplitude of the video signal over time, i.e., the video waveform. It is also known to couple an oscilloscope display to means for counting the horizontal lines following a vertical retrace, whereby a selected (counted) line of the video signal is displayed repetitively as it occurs. Such a feature is known as a "line select" feature. Typically, the operator has the option of changing the line selected from a field or set of fields for display, with the currently selected line being indicated numerically a the line count from the last vertical retrace. As the selected line is changed, either the output of the line counter or perhaps a mechanical position indicator changes correspondingly, for indicating to the operator the particular line which has been selected and is being displayed graphically.

Display of a given counted line of the television signal as described has certain problems in that the signal is repeated only at the repetition rate of the video frame, i.e., two fields or 30 times per second in an interleaved-frame scanning arrangement wherein the horizontal lines of alternate fields are placed between one another. In order to obtain sufficient brightness of the display and to prevent undue flickering, the luminosity and the persist time of the oscilloscope display must be increased substantially. This tends to decrease the precision with which the changing video information is graphically displayed.

Display of a video line selected by counting the lines following a vertical retrace also is a cumbersome matter. The line count does not relate visually to an area of the display, whereby the operator may have to find a particular line by a process of trial and error, estimating the line number of a particular desired part of the video field or homing in on a particular line by varying the selection apparatus until some known attribute appears in the displayed line. One known possibility is to blank all the lines except the selected line, however this obviously omits all of the video field information apart from the selected line. A monitor apart from the display may be needed in order to view the overall picture from which one line is selected for display on the oscilloscope graphic display. The need for both a video monitor and an oscilloscope display increases costs.

It would be desirable to provide a single display apparatus which simultaneously shows video information in a picture or monitor format and in a graphic format of amplitude vs. time. However there are conflicts due to time and space constraints. The horizontal timing of video scanning is such as to provide a relatively long trace and a very brief retrace. Assuming the same electron beam source and deflection apparatus is to be used for both forms of display, the time during which a given line of video is driving a picture display on the screen cannot be the same time during which that line is driving a graphic display. If the two formats are used alternately, then flicker and intensity problems are doubled, and in any event additional circuitry becomes necessary to vary operation of the deflection circuits such that the two display formats are separated from one another on the screen, in each case being scanned across a limited portion of the screen area during the timing of the full horizontal trace.

SUMMARY OF THE INVENTION

It is an object of the invention to provide a useful, convenient and inexpensive means for selecting and displaying a desired horizontal line in a video signal in two formats on the same CRT.

It is a further object to display on the same CRT a picture format video signal of a video field and a graphic image of amplitude over time for one or more selected horizontal lines in the signal.

It is also an object of the invention to provide a means for indicating the particular video line in a television picture which is selected for display, by increasing the luminance of the selected line in the video image or picture displayed.

It is a further object of the invention to provide a control device which modulates beam generation and deflection circuits of a monitor CRT apparatus so as to select, indicate and display a horizontal line of graphic video information and at least part of the full picture on the same CRT.

It is another object of the invention to provide video storage in a display apparatus wherein the video signal and a video waveform monitor display are multiplexed onto a single display screen, the selected line being highlighted in the picture by increased luminance, and the corresponding video waveform being displayed in monochrome, adjacent the displayed picture on the CRT.

These and other objects are accomplished by a video monitoring device which displays on the same CRT screen a picture format video signal and a graphic format of one or more selected horizontal lines in the video signal, the selected line being highlighted in the picture format. An intensity modulator, and vertical and horizontal deflection modulators are coupled to the beam generator and to the deflection circuits, the modulators also being coupled to a control device for changing functions from picture format display to graphic format display as the beam is deflected in a raster pattern. A video memory stores at least the video information of the line to be displayed, for reading out the information in the graphic format. The control device outputs at least one control word for each horizontal line, to switch between the picture format, wherein luminance, saturation and hue are controlled by the amplitude, DC offset and frequency of the video signal, and the graphic format, wherein luminance is held constant and vertical deflection is modulated by the amplitude of the video signal during horizontal scanning, for producing the graphic display.

BRIEF DESCRIPTION OF THE DRAWINGS

There are shown in the drawings exemplary embodiments of the invention as presently preferred. It should be understood that the invention is not limited to the precise arrangements and instrumentalities shown and discussed, and is capable of variation in accordance with the scope of the appended claims and their reasonable equivalents. In the drawings.

FIG. 3 is a schematic block diagram illustrating the invention and their functional interconnections.

DETAILED DESCRIPTION OF THE PREFERRED EMBODIMENTS

Figure 1:
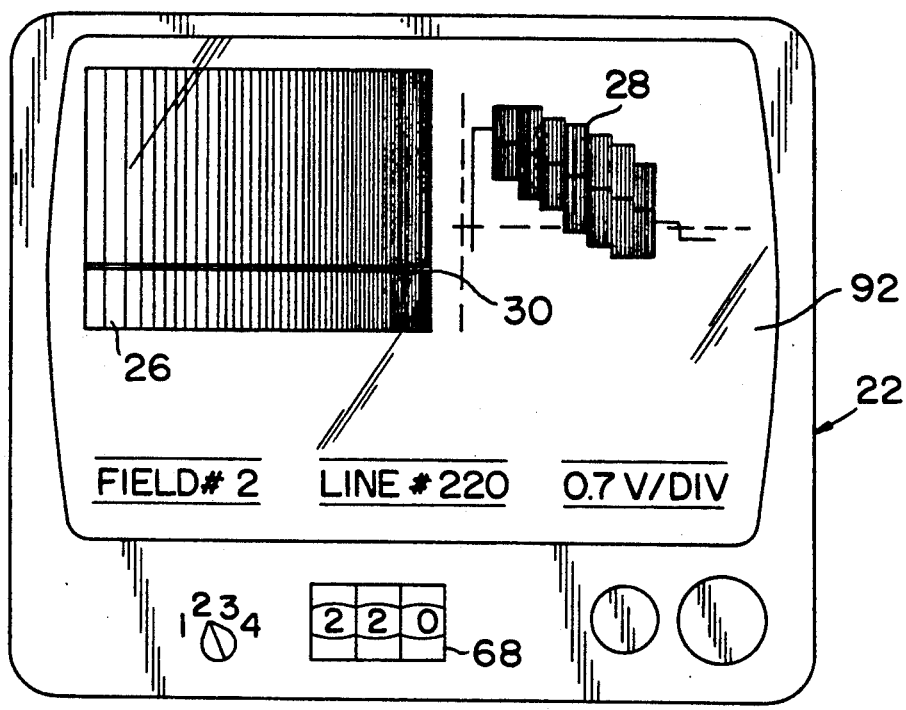
FIG. 1 is an elevation view of a display screen according to the invention, simultaneously displaying a picture and a video waveform corresponding to a selected, highlighted line.

With reference to FIG. 1, a video apparatus 22 simultaneously displays on one CRT 90 a video picture 26 and a graphic display 28 of the corresponding video waveform at least at one selected line 30 in the video picture, highlighting the selected line 30 by altering the luminance in the picture 26, for example brightening the line in the picture 26.

With further reference to FIG. 3, a video signal receiver or other video source 34 produces the video signal. The video signal includes at least one field of vertically displaced horizontal lines of information, and typically includes two fields of interleaved horizontal lines, which appear alternately, one succession of the two fields being required in order to complete a frame of the signal displayed.

The number of horizontal lines and the timing of the lines vary among picture formats (e.g., NTSC vs. PAL), and the invention is applicable to an of the formats. In any event, there are a predetermined number of horizontal lines in a complete frame, which may be an interleaved arrangement of successive video fields. The first and second fields provide every other line when interleaved, which can be considered the even numbered lines and the odd numbered lines. It is possible to address the individual lines in a frame with reference to the horizontal line count in the frame. Preferably, according to the invention the lines are addressed with reference to the field identity (e.g., one through four for NTSC or one through eight for PAL) and the horizontal line count since the last vertical retrace. The frame number and the line count since last vertical retrace can readily be converted into a frame line number. For example if two successive fields of interleaved lines form a complete frame, the relationship is $N=2C+F-1$, where N is the frame line number, C is the field line number and F is 1 or 2, etc.

The dual images of the picture and the graphic video line waveform are presented on a display, for example on the screen 92 of a cathode ray tube 90 coupled to an electron beam driver 62 and scanning deflection circuits operable to effect vertical and horizontal deflection of the electron beam as incident on the CRT screen. The screen bears phosphors which glow as a function of the beam intensity, Which intensity is modulated to form the image which is displayed. The display device 22 includes a vertical deflection driver and a horizontal deflection driver, and means for varying the intensity of the electron beam in coincidence with scanning of the beam over respective areas of the screen.

In the exemplary embodiment shown in FIG. 1, the picture display 26 is illustrated with a color bar test pattern, and the corresponding graphic display 28 is placed adjacent the picture display, on the same screen. The graphic display 28 shows the familiar variation in the amplitude of the video signal as characteristic of a color bar display across a single horizontal line. In particular the graphic display shows the voltage amplitude of the signal during selected horizontal line 30.

According to the invention a control device 66, identified in FIG. 3 as the line rate controller, has an input coupled to the video signal via a sync stripper 78 and outputs coupled to the vertical and horizontal deflection drivers 46, 48 for positioning the beam, and to the beam current or kinescope driver 62 for varying the beam intensity. The control device 66 is operable to increase the intensity of a selected horizontal line 30 of the video signal in the picture display 26 and to display both the video picture corresponding to at least one field of the video signal and also the corresponding graphic video waveform 28 for the selected horizontal line 30.

Line control device 66 includes line counter 75, which counts horizontal lines via horizontal sync pulses on line clock $H_S$. The line counter 75 is reset upon the occurrence of vertical reset at signal $V_S$. The horizontal and vertical sync pulses are extracted from the incoming video signal from video source 34 by sync stripper 78. Based upon the present line count since last vertical retrace, stored in line counter 75, and the desired line count, for example as input on thumbwheel switches or other line select input means 68, the line rate controller selects deflection and beam intensity (luminance) conditions needed to produce the picture display 26 with highlighted selected line 30, and the graphic display 28. The line rate controller 66 thus modulates scanning deflection of the vertical and horizontal deflection drivers 46, 48 to place the graphic video waveform and the picture at different areas of the screen, and modulates the beam current driver output to highlight in the picture the selected horizontal line. For switching between the modes of display, outputs of the line rate controller 66 are coupled to a signal-select block 52, intensity select block 54, vertical deflection select block 56 and horizontal offset block 58.

In addition to the line select input means 68 shown in FIG. 1, a field select input means such as a multi-position switch can be included as well. The field select input means allows line addressing via field number and line number within the field (as opposed to line number within the full frame of interleaved fields). In FIG. 1, four fields are selectable, as appropriate for NTSC. In a PAL embodiment it would be appropriate to allow selection among eight fields.

Figure 2:
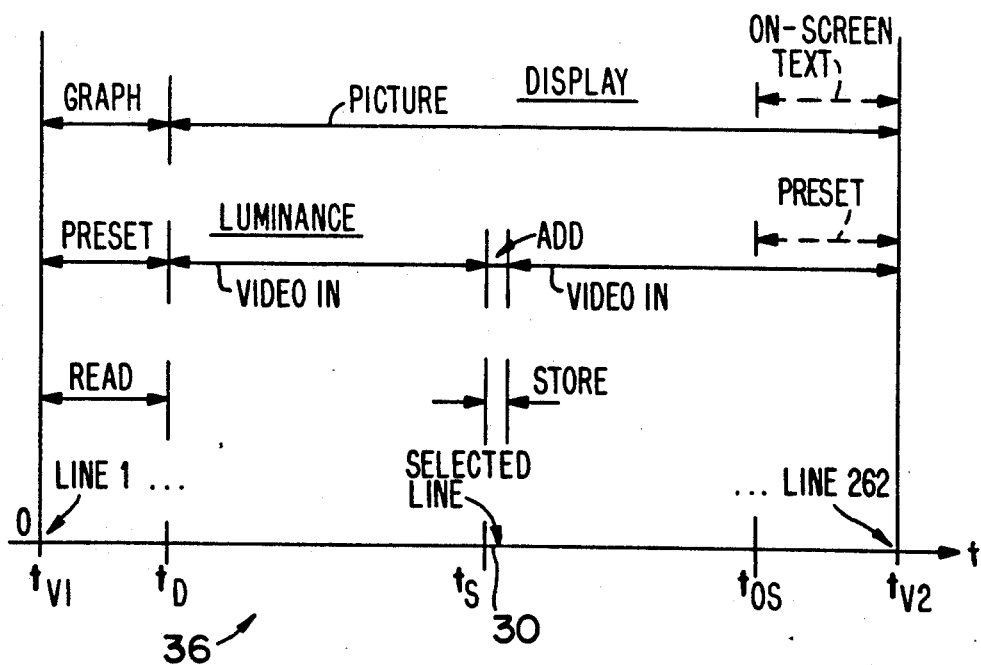
FIG. 2 is a timing diagram illustrating operation of the invention over a video frame.

FIG. 2 illustrates the timing of the switching functions effected by line rate controller 66, and in particular the progression of display, luminance (beam intensity) and video memory access. The video frames of course proceed immediately after one another, with only a brief vertical blanking period provided for vertical retrace between the last line of one field and the first line of the next field. Whereas the line rate controller is synchronized to the vertical and horizontal rates of the incoming video signal by sync stripper 78, the time elapsed over a video field from time $t_{V1}$ to time $t_{V2}$ would occupy all the time available for display. However, according to the invention a limited number of lines (e.g., nine lines), preferably at the beginning of each field, are not displayed in the picture display 26, and the time between the commencement of the first line at $t_{V1}$ in FIG. 2 and the commencement of first displayed lines at $t_D$ is devoted to the graphic display 28. Similarly, a predetermined number of lines at the end of the field can be devoted to optional generation of on-screen characters, namely from time $t_{OS}$ to time $t_{V2}$, rather than to the display of the video lines. Display of on-screen characters is indicated in dotted lines over the "display" and "luminance" lines of FIG. 2.

In the event that it is necessary to select all the lines for display, the apparatus can be arranged to permit the selection of a line occurring during the times normally devoted wholly to graphic display or on-screen character generation. A selected line 30 in the leading (or trailing) line times of the field, which otherwise would be omitted from the video display portion 26 of the screen during the time devoted to graphic display, can be shown, highlighted as the first (or last) line shown and graphed. This is accomplished by using line times before (or after) the selected line for display of the graphic information (or optional on-screen characters). For example, if nine leading line times are devoted to graphing and one of these lines is selected, then graphing is continued through ten lines rather than nine, thus allowing for nine line times of graphic display during line times before and after the selected line.

The line rate controller 66 controls input and output to a video storage memory 72, which stores at least one line to be displayed. The memory 72 can be a digital memory coupled to the device via suitable A/D and D/A converters, or can be an analog delay line. The memory 72 is written at least during the picture display of selected line 30, and read back during the graphic display time from $t_{V1}$ to $t_D$. Memory 72 can be arranged to store more than a single line, such that more than one line is displayed graphically, only one line being shown in the drawings for purposes of illustration.

As shown in FIG. 3, by appropriate signals to signal select block 52, line rate controller 52 gates through either the video information on the video input from source 34, or the stored selected line from video memory 72. The selected line can be read out repetitively if desired, for multiple scans in the graphic display area 28, for obtaining sufficient brightness for easy viewing of the graphic display. Alternatively, some of the horizontal line intervals which are not devoted to scanning of picture 26 can be used for other display particulars, such as superimposing a scale or graticle on the graphic waveform, adding to the display a field number, line number and/or an indication of the waveform amplitude, etc.

Line rate control device 66 highlights the selected horizontal line by increasing its intensity in the picture display 26. In the picture display mode (times $t_D$ to $t_{OS}$), the displayed video signal VID is the incoming video from source 34. When the line count equals the value selected via input means 68, controller 66 enables intensity selection block 54 to add a preset additional luminance to the luminance level extracted from signal VID by luminance extractor 53. The output of selection block 54 is applied to the beam current driver 62. Therefore, the picture information 30 at all times during the picture display from $t_D$ to $t_{OS}$ reflects the luminance level encoded by the video signal; however, during the selected line 30 at $t_S$, the level is higher by a preset amount than the encoded level. With reference to picture field 26 in the test pattern of FIG. 1, the luminance still decreases proceeding through the progressively darker color bars, but the luminance of selected line 30 is increased sufficiently to readily distinguish the selected line from the other lines. It is also possible to highlight the selected line by varying aspects of the display other than luminance (e.g., hue or saturation), however varying the luminance is preferred as it points out the selected line without substantially changing its appearance.

During the graphic display interval from $t_{V1}$ to $t_D$, controller 66 selects the stored video line from video memory 72 via signal select block 52. Signal VID is produced, however in this mode controller 66 sets the beam intensity via intensity select block 54 to a constant level, regardless of the level of signal VID. Accordingly, the output of beam driver 62 maintains a constant beam intensity. The graphic waveform 28 thus has a familiar white-on-black or monochrome appearance. In the event the on-screen display of characters is undertaken, the beam intensity is set to a constant level between times $t_{OS}$ and $t_{V2}$ as well, for display of the on-screen characters at a stable intensity.

During the picture display mode the horizontal and vertical deflection circuits, namely ramp generators 122, 124, deflection driver circuits 48, 46 and deflection coils 42, 44, are driven in the familiar manner at the horizontal and vertical rates defined by the incoming video signal from source 34. However the amplitude of the ramps is arranged to maintain an image size smaller than the full screen and the DC offset places the picture image at the desired location on the screen. In the embodiment shown the picture image is placed at the beginning of the area scanned, and all that is required is to reduce the DC offset level and peak to peak amplitude of the deflection driving ramp currents.

In order to display the graphic image at $t_{V1}$ to $t_D$, the vertical deflection drivers are coupled to signal VID (now containing the stored selected line video signal) rather than to the vertical ramp generator 124. Selection block 56 couples signal VID to the vertical deflection drive circuits 46, under control of the controller 66. The output of vertical deflection driver 46 provides a current which is proportional to the voltage amplitude of the stored line signal.

The beam is still scanned horizontally at the horizontal rate defined by the incoming video signal, which synchronizes operation of the line rate controller 66. Whereas the graphic image 28 is displaced horizontally on screen 92 from picture image 26, it is necessary to add a DC offset to the horizontal deflection drive current produced by horizontal deflection driver 48. An output of controller 66 is coupled to enable horizontal offset generator 58 for this purpose. A predetermined offset level is added to the output of horizontal ramp generator 122 at summing junction 134, and applied to the deflection driver 48. The DC offset is only enabled during the graphic display interval, whereby the graphic image is horizontally displaced from the picture image.

In the embodiment shown the picture image is on the left and the graphic image on the right. It is readily possible and within the scope of the invention to displace the two images in other particular ways. For example, the picture image and graphic image could be exchanged in position by providing the offset during the picture display interval rather than the graphic display interval. The two images could also be displaced vertically instead of horizontally, or in both directions. Control devices as suggested in FIG. 1 could be provided to allow the user to vary the respective offsets as desired, or to vary the amplitude of the graphic display, for example to accommodate a plurality of selected line waveforms. Similarly, the graphic presentation could be rotated by modulating the horizontal deflection with the video signal rather than the vertical deflection.

Although the invention can be embodied in various analog and digital particulars, a digital embodiment is preferred. The line rate controller 66 can be included as a functional element of a microprocessor controller which also accomplishes other functions such as the display of the text information as shown in FIG. 1, etc. In such an embodiment the outputs of the controller 66 as applied to the selection blocks 72, 52, 54, 56 and 58 can be bits of one or more digital control words which are coupled to the respective elements along signal lines or along a control bus. In a simple embodiment, the control word need only have sufficient bits to switch the respective selection blocks as in Table 1, the particular modes of operation being shown in Table 2. In a more complex embodiment, the selection blocks can be arranged to add selectable offsets, to control intensity to a user-selected point in a range, etc.

TABLE 1

| Controlled Element | Control Word Modes |
| --- | --- |
| Intensity Select Block 54 | Video Luminance; Fixed Intensity |
| Source Select Block 52 (VID) | Source 34; Video Memory 72 |
| Video Memory 72 | Read; Write; Hold |
| Horizontal Offset 58 | Left; Middle |
| Vertical Deflection Select 56 | Vertical Ramp; Video Luminance |

TABLE 2

| Picture Display ($t_p$-$t_{os}$) | |
| --- | --- |
| Intensity Select Block 54 | Video Luminance |
| Source Select Block 52 (VID) | Source 34 |
| Video Memory 72 | Hold |
| Horizontal Offset 58 | Left |
| Vertical Deflection Select 56 | Vertical Ramp |
| Line Select ($t_s$, line 30) | |
| Intensity Select Block 54 | Video Lum. Plus Fixed Intensity |

TABLE 2-continued

| | |
| --- | --- |
| Source Select Block 52 (VID) | Source 34 |
| Video Memory 72 | Write |
| Horizontal Offset 58 | Left |
| Vertical Deflection Select 56 | Vertical Ramp |
| Graphic Display ($t_{\eta}$-$t_D$) | |
| Intensity Select Block 54 | Fixed Intensity |
| Source Select Block 52 (VID) | Video Memory 72 |
| Video Memory 72 | Read |
| Horizontal Offset 58 | Middle |
| Vertical Deflection Select 56 | Video Luminance |

Controller 66 operates at the line rate of the incoming video signal from source 34. Therefore, the controller can output a distinct control word for each line of video, as a function of the line number. As the line count proceeds through the field or frame, the appropriate bits are set for first displaying the picture image, highlighting and storing the selected line, and finally generating the graphic image. The graphic image can be repeated for a number of horizontal line intervals, and can even be repeated during part of the vertical retrace time or the initial horizontal rate intervals following the beginning of a field, for increased brightness in the graphic image.

The invention has been discussed in connection with preferred exemplary embodiments, and variations on the preferred embodiments will now become apparent to persons skilled in the art. Whereas the invention is intended to encompass the disclosed embodiments and a range of variations in accordance herewith, reference should be made to the appended claims and their reasonable equivalents in order to assess the scope of the invention in which exclusive rights are claimed.

I claim:

1. A video apparatus for simultaneously displaying a video picture and a video waveform representing a selectable line in the video picture, comprising:
   a video signal receiver operable to produce a video signal representing at least one field of vertically displaced horizontal lines;
   a display device, having scanning means operable to effect vertical and horizontal deflection, including a vertical deflection driver and a horizontal deflection driver, and means for varying the intensity of points on a screen;
   a control device synchronized to the video signal and coupled to the vertical and horizontal deflection drivers and to the means for varying the intensity, the control device being operable to increase the intensity of a selected horizontal line of the video signal and to display both a video picture corresponding to the at least one field of the video signal and a graphic video waveform corresponding to the selected horizontal line, by modulating scanning deflection of the vertical and horizontal deflection drivers to place the graphic video waveform and the picture at different areas of the screen, and by modulating the intensity to highlight in the picture the selected horizontal line; and,
   means coupled to the control device for selecting at least one said horizontal line for graphic display and highlighting via the control device.

2. The video apparatus according to claim 1, wherein the control device highlights the selected horizontal line by increasing its intensity in the picture.

3. The video apparatus according to claim 1, wherein the control device modulates the intensity during presentation of the video waveform to maintain a constant intensity.

4. The video apparatus according to claim 1, further comprising a video storage means operable to store at least the selected horizontal line, and wherein the control device is operable to repetitively read out the selected line in a graphic format.

5. The video apparatus according to claim 4, wherein the video signal includes a line sync and further comprising means coupled to the control device for separating the line sync.

6. The video apparatus according to claim 5, wherein the control device is operable in response to user inputs to select any of a plurality of relative positions of the picture and the waveform on the screen.

7. The video apparatus according to claim 1, wherein the controller is operable to highlight and display a plurality of the horizontal lines of the video signal simultaneously.

8. A video monitoring device comprising:
a CRT, including a source of an electron beam, a screen responsive to the beam, and means for deflecting the beam vertically and horizontally while varying intensity of the beam to provide a scanned pattern;
a video signal source operable to produce a video signal;
an intensity modulator coupled to the video signal and to the CRT, the intensity modulator varying the electron beam intensity;
a horizontal deflection modulator coupled to the CRT for deflecting the beam horizontally;
a vertical deflection modulator coupled to the CRT for deflecting the beam vertically; and,
a control device coupled to the video signal and to the horizontal and vertical deflection modulators, the control device modulating vertical and horizontal deflection via the deflection modulators, and modulating the electron beam intensity, such that a field of the video signal is displayed on a portion of the screen and a graphic display illustrating an amplitude of the video signal for at least one horizontal line is displayed on another portion of the same said screen.

9. The video monitoring device according to claim 8, further comprising memory means coupled to the video signal and to the control device, the memory means being operable to store at least a portion of the video signal corresponding to the at least one horizontal line during said at least one horizontal line, and wherein the control device is operable to offset at least one of a horizontal position and a vertical position of the beam, and to display the at least one horizontal line once in picture format by modulating at least one of luminance, saturation and hue as a function of the video signal, and again in graphic format by modulating at least one of vertical and horizontal position of the beam over time, at substantially fixed luminance, for graphically displaying the video signal occurring during the at least one horizontal line.

10. The video monitoring device according to claim 8, wherein the control device is further operable to vary the intensity of the beam during the picture format display of the at least one horizontal line, for highlighting said horizontal line.

11. The video monitoring device according to claim 10, further comprising a line selection means coupled to the control device, the line selecting means being operable to determine which at least one horizontal line of a field of horizontal lines is displayed and highlighted.

12. The video monitoring device according to claim 8, wherein the control device is operable to output a digital control signal for determining functional conditions of the intensity modulator and the deflection modulators.

13. The video monitoring device according to claim 12, wherein the control device is operable to output said control signal for each horizontal line of the video signal, whereby any number of horizontal lines in the field can be selected for highlighting and display.

14. The video monitoring device according to claim 13, wherein the control signal includes information selecting at least one of a level of beam intensity, a horizontal offset position, a vertical offset position, a video source, and a storage function of the memory means.

15. The video monitoring device according to claim 8, wherein the video signal is displayed substantially during the field of the video signal and the graphic display is produced at a beginning of the field.

16. The video monitoring device according to claim 15, wherein the graphic display is produced in lieu of display of at least one horizontal line of the frame occurring at the beginning of the field.

17. The video monitoring device according to claim 15, wherein the information of the control signal includes a picture display control word and a line display control word, for defining different combinations of intensity and position functions during display of in the picture format and in the graphic format, respectively.

18. The video monitoring device according to claim 8, wherein the means for deflecting the beam includes a horizontal ramp generator and a vertical ramp generator and further comprising means for synchronizing outputs of said ramp generator for display of the video signal, and wherein the vertical and horizontal deflection modulators produce outputs which are summed with the outputs of said ramp generators for coupling to the CRT.

19. The video monitoring device according to claim 18, further comprising a sync stripper and a counter, the sync stripper providing a clock signal corresponding to a horizontal rate of the video signal, and coupled to the counter for counting horizontal lines, and further comprising means for resetting the counter between video fields.

20. The video monitoring device according to claim 19, wherein the horizontal rate of the video signal corresponds to a video rate of said video signal in real time.

* * * * *